Sept. 22, 1925.
W. C. FREELAND
HEADLIGHT CONDITIONING MEANS FOR MOTOR VEHICLES
Filed June 5, 1924
1,554,911
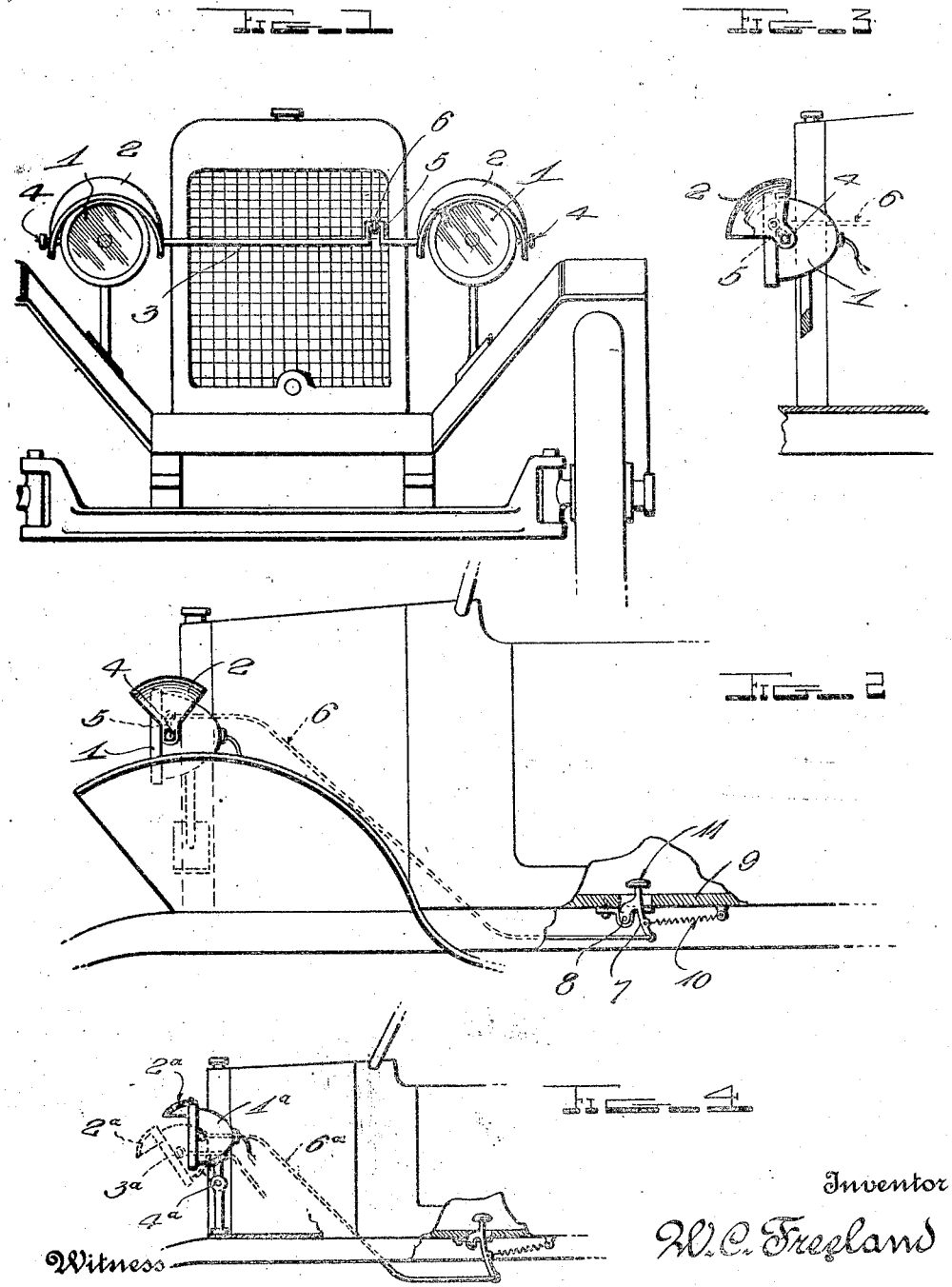

Patented Sept. 22, 1925.

1,554,911

UNITED STATES PATENT OFFICE.

WILLIAM C. FREELAND, OF LOMAX, ILLINOIS.

HEADLIGHT-CONDITIONING MEANS FOR MOTOR VEHICLES.

Application filed June 5, 1924. Serial No. 718,136.

*To all whom it may concern:*

Be it known that I, WILLIAM C. FREELAND, a citizen of the United States, residing at Lomax, in the county of Henderson and State of Illinois, have invented certain new and useful Improvements in Headlight-Conditioning Means for Motor Vehicles; and I do declare the following to be a full, clear, and exact description of the invention, such as will enable others skilled in the art to which it appertains to make and use the same.

One object of my invention is to provide effective means for conditioning the headlights of automobiles, so that they cannot project rays of light above a predetermined plane and consequently cannot blind the drivers of approaching vehicles, or pedestrians.

Another object of the invention is to provide a pair of hoods normally disposed over the headlights but capable of being swung downwardly in front of the upper portions thereof to condition said headlights in the manner above set forth.

A still further object is to provide novel operating means which is moved in one direction by one foot of the driver, but is normally held in its other position by spring means so as to allow unobstructed forward projection of rays from the headlights.

With the foregoing in view, the invention resides in the novel subject matter hereinafter described and claimed, the description being supplemented by the accompanying drawing.

Figure 1 is a front elevation of portions of an automobile, showing the application of my invention thereto.

Figure 2 is a side elevation partly broken away and in section, showing one of the hoods in its normal inoperative position.

Figure 3 is a fragmentary view similar to a portion of Fig. 2 but illustrating the hood swung to a lowered position.

Figure 4 is an elevation partly in section illustrating a different form of the invention, in which the headlight and its hood swing as a single unit.

In the construction shown in Figs. 1, 2 and 3, the numerals 1 designate a pair of stationarily mounted automobile headlights. Normally extending over these headlights, as shown in Figs. 1 and 2, are two transversely arched hoods 2 whose inner sides are secured to a horizontal transverse shaft 3 which extends between the two lights. The outer sides of the hoods 2 are pivoted at 4 to the headlights 1 and the pivots are preferably co-axial with the shaft 3. When this shaft is turned in the proper direction, it moves the hoods 2 downwardly, to positions in front of the upper portions of the headlights 1 and these hoods then prevent the projection of light rays above a predetermined plane, so that the blinding of pedestrians or the drivers of approaching vehicles, is prevented.

For turning the shaft 3, I prefer to employ the construction shown. The numeral 5 designates a crank on the shaft 3 to the front end of which an angular rod 6 is pivoted, the rear end of said rod being pivoted to a bell crank 7 which is fulcrumed at 8 under the floor 9 of the machine equipped with the invention. A coiled spring 10 is connected at one end to the bell crank 7 and is suitably anchored at its other end, so that said spring normally acts to hold the bell crank, the rod 6 and the shaft 3 in a position to retain the hoods 2 in the inoperative positions shown in Figs. 1 and 2. The bell crank 7 is provided with a pedal portion 11 which passes through an opening in the floor 9 and is within easy reach of one of the driver's feet. By simply depressing the pedal portion 11, the bell crank 7, rod 6, and shaft 3 are moved to immediately lower the hoods 2 to the operative position shown in Fig. 3. The hoods will stay in this position as long as the bell crank 7 is held by the driver's foot, but when the headlights may again be normally operated, it is simply necessary to remove the foot from the pedal portion 11, whereupon the spring 10 returns all parts immediately to the normal positions.

It will be seen from the foregoing that the device may be quickly and easily operated and that it will be exceptionally effective to prevent the headlights from having any blinding action on the drivers of other machines or upon pedestrians. Consequently, a great number of accidents will be avoided.

If desired, the construction shown in Fig. 4 may be used. In this figure, the headlights 1ª are pivotally mounted at 4ª to swing downwardly, and each headlight is provided with a hood or visor 2ª which is secured to and movable bodily with it. The two headlights may be considered as connected by a shaft 3ª which is in turn connected with the front end of an angular operating rod 6ª, similar to the rod 6 and controlled in the same manner as above described. Normally, the headlights 1ª stand in the position shown in full lines in Fig. 4, but when it is desired that their rays shall not be projected above a predetermined elevation, the driver effects actuation of the rod 6ª and thus swings the lights to the dotted line position of Fig. 4.

As excellent results may be obtained from the general structures herein disclosed, such structures may well be followed, but within the scope of the invention as claimed, minor changes may be made.

I claim:

The combination with a pair of automobile headlights of a pair of hoods normally disposed over said headlights and pivotally connected at their outer sides to the outer side of the headlights, a shaft extending between said hoods and having its ends fixed to the free inner sides of the hoods, said shaft being bent near one end to form a crank; an operating rod pivotally connected at its outer end to said crank and extending rearwardly through the radiator and under the hood and thence downwardly and rearwardly beneath the floor of the automobile, a bracket secured beneath the floor of the automobile, an operating lever having a short off-set arm pivoted to said bracket and a longer arm, the upper end of which projects through an opening in the floor of the automobile and to the lower end of which is connected the inner end of said operating rod, a spring connected with said longer arm and with the bottom of the automobile whereby the hoods are retracted to and normally held in an inoperative position above the headlights and a foot pedal arranged on the upper end of the longer arm of said lever above the floor of the automobile and adapted to be depressed by the driver's foot to operate the lever, operating rod, shaft and hoods in a manner to deflect the rays from the headlights below a given plane.

In testimony whereof I have hereunto affixed my signature.

WILLIAM C. FREELAND.